United States Patent [19]

Scruggs

[11] 4,083,606
[45] Apr. 11, 1978

[54] WHEEL COVER LOCKING DEVICE

[76] Inventor: Charles Scruggs, 8033 South Essex, Chicago, Ill. 60617

[21] Appl. No.: 722,303

[22] Filed: Sep. 10, 1976

[51] Int. Cl.² .............................................. B60B 7/06
[52] U.S. Cl. .............................. 301/37 AT; 301/37 SC
[58] Field of Search ............ 301/37 AT, 37 S, 37 SC, 301/108 S, 108 SC; 70/163–169, 259; 151/68

[56] References Cited

U.S. PATENT DOCUMENTS

| 1,707,458 | 4/1929 | Clench | 301/9 DH |
| 2,249,568 | 7/1941 | Shinliver | 70/259 X |
| 2,722,822 | 11/1955 | Thomas | 301/37 AT |
| 3,513,673 | 5/1970 | Trainor | 70/259 |
| 3,534,570 | 10/1970 | Mauro | 70/167 |
| 3,965,708 | 6/1976 | Smiley | 301/37 AT X |

FOREIGN PATENT DOCUMENTS

| 1,021,957 | 12/1952 | France | 301/37 S |
| 633,632 | 10/1927 | France | 301/108 S |
| 721,679 | 1/1955 | United Kingdom | 151/68 |

*Primary Examiner*—Robert B. Reeves
*Assistant Examiner*—Charles A. Marmor

*Attorney, Agent, or Firm*—Ladas, Parry, Von Gehr, Goldsmith & Deschamps

[57] ABSTRACT

A wheel cover locking device provides adjustable locking capability for a wheel cover of an automotive vehicle utilizing a "C"-shaped bracket having an integral mounting flange, and a bolt receiving spacer lug assembly adjustably mounted on the bracket. The spacer lug is adjustable to accommodate wheel covers for automotive wheels of varying diameters. The spacer lug is fastened to a flat mid-portion of the bracket and adapted to fit beneath a wheel cover. On the outside of the wheel cover a cap member is placed, with a locking bolt extending through the cap member and the wheel cover and threaded into the spacer lug and bracket assembly. The bracket flange is a flat end portion having an aperture to permit securing the assembly to the wheel lug of the vehicle. The cap member or accompanying mounting washer includes a pin extending through the wheel cover to prevent rotative removal of the wheel cover from the wheel. The locking device protects the wheel cover and further protects the wheel itself from being easily removed from the vehicle.

3 Claims, 4 Drawing Figures

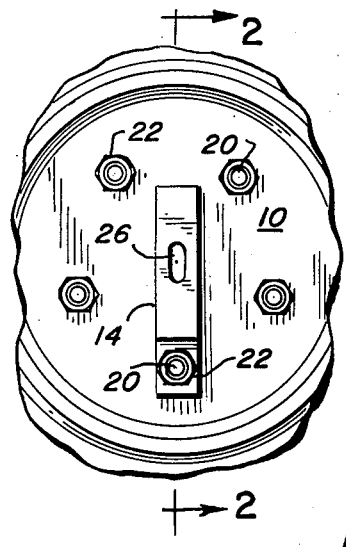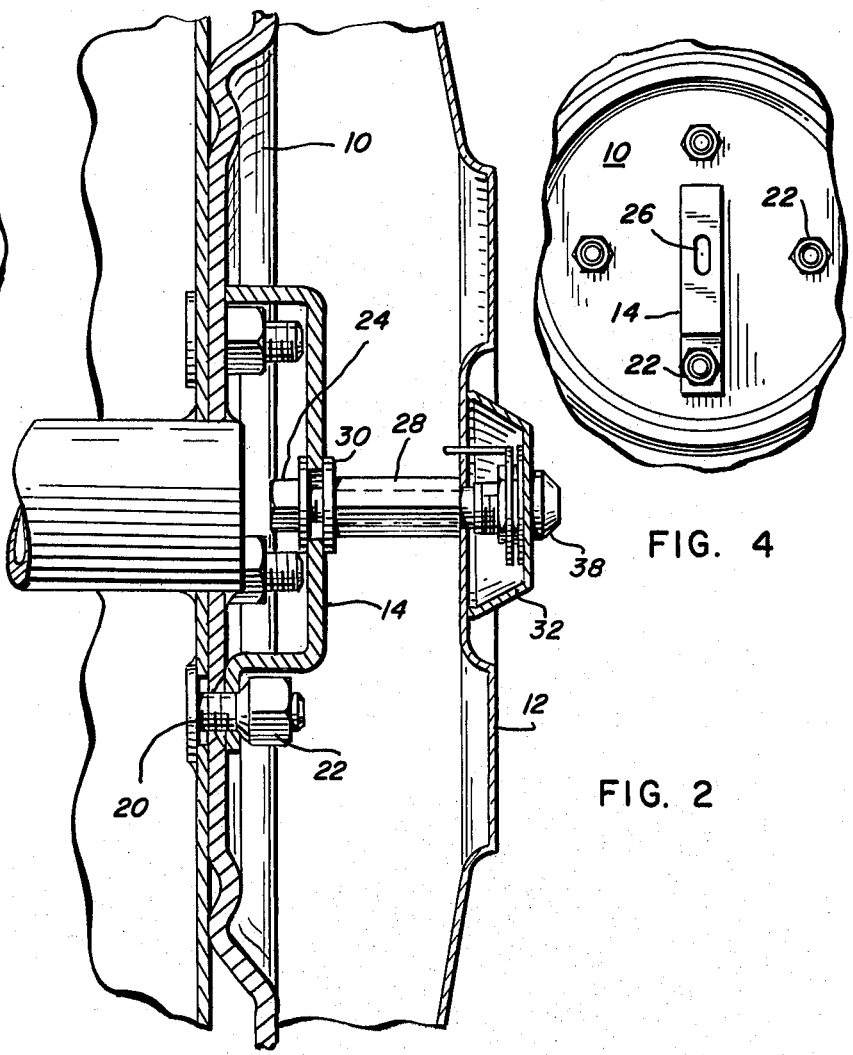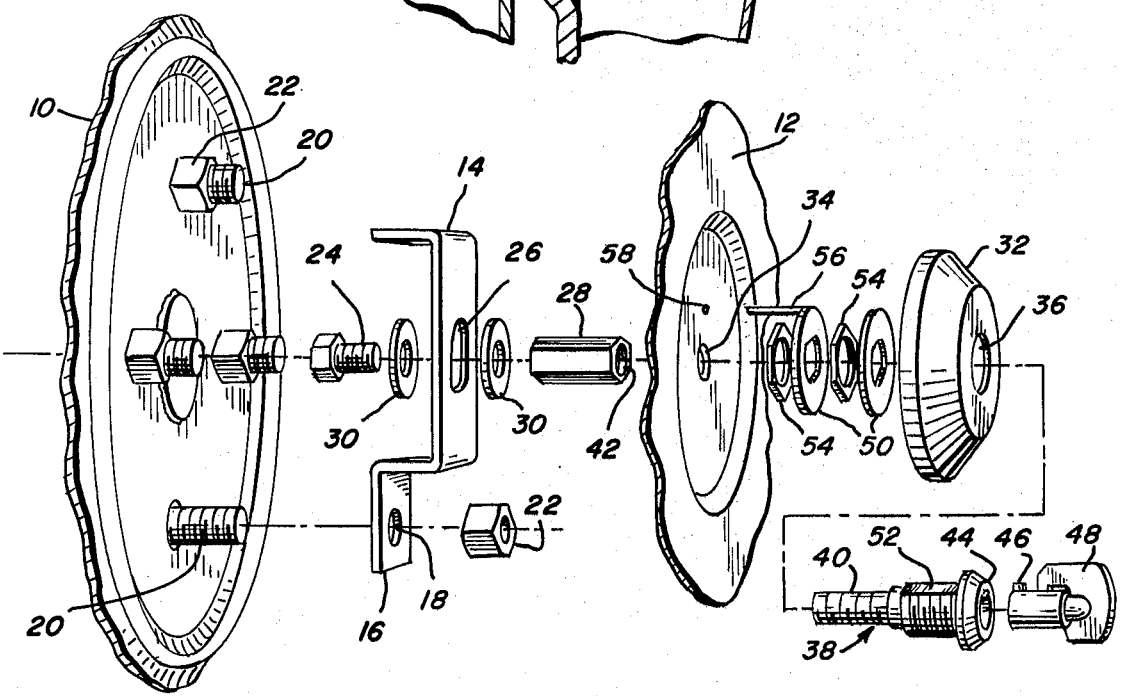

WHEEL COVER LOCKING DEVICE

BACKGROUND OF THE INVENTION

The invention concerns an improved wheel cover locking device adapted to prevent unwanted removal of a wheel cover from an automotive vehicle wheel.

The invention is particularly useful in protecting an ornamental wheel cover which can be secured to protect the axle hub of a vehicle wheel. The invention is adaptable for any type of wheel cover, however, and for wheels of different diameters.

In the past a special lock has been marketed for securing an ornamental wire basket type wheel cover to a vehicle wheel, consisting of a partly spherical cup-shaped member having a specially designed bolt extending therethrough, replacing the manufacturer's standard wheel cover cap. The head of such a bolt is provided with an individually configured slotted head to be tightened and removed only by use of a specially designed key. This device however could not be readily adapted for general use with other kinds of wheel covers, since vehicles generally have no lock bolt receptacle on either the wheel or axle hub.

SUMMARY OF THE INVENTION

The invention provides an improved device whereby a wheel cover of any automotive vehicle can be locked into place and which will provide protection not only for the wheel cover but also prevent unwanted access to the wheel lugs themselves.

An increasing problem has been the vandalizing of wheel covers, especially those of ornamental design having a considerable resale value. The theft of wheel covers however is prevented by the inventive locking device which effectively protects the wheel cover from being removed without bending or otherwise disfiguring the wheel cover. In that event of course, the wheel cover would have no value whatsoever.

The invention provides an improved bracket construction with an adjustably mounted lug associated therewith arranged for use with any size of wheel and wheel cover.

DESCRIPTION OF THE DRAWING

FIG. 1 shows an expanded schematic view of a preferred embodiment of the wheel cover locking device, with parts separated and aligned to show the manner of assembly;

FIG. 2 is a cross-sectional view of the preferred wheel cover locking device in assembled condition, and part of the wheel cover and a portion of the wheel to which it is connected;

FIG. 3 is a plan view of a vehicle wheel having five lugs to which the locking bracket of this invention is attached to one such lug; and FIG. 4 is a view similar to FIG. 3 with the locking bracket attached to one lug of a four lug vehicle wheel.

DETAILED DESCRIPTION

Referring to the drawings in FIG. 1 there is shown an expanded schematic view of the invention with associated portions of a vehicle wheel 10 and part of a wheel cover 12 to be assembled therewith. The locking device includes a locking bracket 14 having a generally C-shaped configuration adapted to overlie the center of the wheel, with the mid-portion spaced away from the wheel hub. The bracket includes a generally flat integral mounting flange or extension 16 at one end thereof, parallel to the mid-portion. The extension includes an aperture 18 which is adapted to fit over a conventional threaded wheel lug 20 so that the bracket can be secured against the wheel by means of a standard wheel lug nut 22. It will be understood that the bracket can be secured to the wheel with any selected wheel lug with the mid-portion generally centered over the wheel.

A threaded bolt 24 or other fastener is adapted to pass through an elongated, slot-type aperture 26 formed in the mid-portion of the C-shaped bracket 14. The threaded bolyt 24 extends from one side of the bracket through the slot 26 and into an elongated internally threaded spacer lug 28 arranged on the other side of the bracket 14. By virtue of the elongated slot-type aperture 26 in the bracket, the bolt and spacer lug can be adjustably secured to the bracket 14 at a centered position with reference to the wheel, depending upon the size of the wheel so as to permit alignment of the spacer lug 28 over the center of the wheel. For convenience a pair of washers 30 can be arranged one on each side of the bracket 14 as the bolt 24 is engaged in the spacer lug 28.

The wheel cover 12 is then set over the spacer lug 28 which has been assembled with the bracket 14 in place, and the rim (not shown) of the wheel cover 12 is fastened to the wheel 10 in the usual manner. To complete the locking assembly a concave cap member 32 is placed over the center of the wheel cover 12 for the final assembly step. The wheel cover is provided with a centrally disposed aperture 34 and the cap member 32 includes a centrally disposed aperture 36, adapted to receive a locking bolt 38. The bolt 38 includes a threaded portion 40 adapted to engage a threaded end portion 42 of the spacer lug 28 after passing through the aperture 34, 36, in the wheel cover 12 and cap member 32, respectively. The bolt 38 has a sloted head 44, engageable with a corresponding driving end 46 of a tightening and removing tool 48, as is well known.

It will be understood that any commercially available lock bolt and tool can be used, including those which are numerically coded.

With the assembly accomplished as described above, the wheel cover 12 will be securely fastened by virtue of the lock assembly to the threaded lug of the wheel 10 and thereafter cannot be removed except by virtue of the engagement of the special tool 48 with the lock bolt 38 as described. An alternative locking arrangement would be to have a key slot provided in the end of the bolt 38 to be engaged by a special unlocking key (not shown) instead of the tool 48. In any event the resulting assembly provides a theft-proof wheel cover locking device by virtue of the secure interconnection directly onto the vehicle wheel lug.

In FIG. 2 there is shown in partial cross-section the assembled configuration whereby the wheel lug 20 and associated lug nut 22 holding the bracket 14 in place, all are fully protected by the overlying wheel cover 12 thereby prevenging unwanted access thereto.

To assist in securing the lock bolt to the wheel cover 12 and spacer lug 28, one or more mounting washers 50 can be arranged on a threaded upper shank 52 of the lock bolt 38. One or more corresponding lock nuts 54 can be threaded onto the shank 52 to secure the washer or washers in place depending on the size and shape of the cap member 32.

The bolt shank 52 can have one or two flattened areas with corresponding washers sized to fit thereover and to avoid relative rotation therebetween. The inner one of the washers 50 includes a pin 56, soldered or otherwise secured to one side thereof and arranged to extend inwardly toward the wheel cover. A corresponding hole 58 is provided in the wheel cover 12 to receive the pin 56 on assembly of the bolt and cap member subassembly. As shown in FIG. 1, the pin 56 extends into the wheel cover hole 58 to assist in preventing undesirable rotation of the assembled locking device relative to the wheel cover.

In FIG. 3 there is shown a wheel 10 with the bracket 14 secured to one of the wheel lugs by virtue of the lug nut 22 in which the wheel has five such lugs. In FIG. 4 the wheel is shown with four threaded lugs with the bracket secured to one of them.

Although the invention has been described with respect to a preferred embodiment thereof, it is to be understood that the invention is not to be so limited since changes and modifications can be made therein which are in the full intended scope of this invention as defined by the appended claims.

What is claimed is:

1. In a wheel cover locking device comprising an elongated, generally C-shaped bracket having means at one end thereof to permit attachment to a wheel lug of a vehicle wheel, an elongated slot aperture extending through the bracket at a mid-portion thereof and overlying the center of a vehicle wheel when said bracket is secured thereto, a wheel cover with an aperture at a mid-portion thereof, an elongated spacer lug having a first and a second threaded opening at either end, a threaded fastener means extending from one side of said mid-portion of said bracket through said slot aperture and into said first threaded opening at one end of said spacer lug to secure said spacer lug to said bracket, said spacer lug second threaded opening abutting at its other end the inner side of the wheel cover, said wheel cover being mountable so that the aperture is in alignment with said second threaded opening of said spacer lug, retainer means comprising a concave annular cap member having a centrally disposed aperture therein and overlying the outer side of the wheel cover, the cap member aperture being in alignment with the other end of said spacer lug, and a lock bolt for securing said cap member to said spacer lug, said lock bolt having a head portion with means for receiving a key, said head portion having a flange portion and a threaded cylindrical first portion, said threaded first portion having at least one flattened portion, wherein the improvement comprises said lock bolt further comprising a threaded shaft portion of a diameter smaller than said first portion and extending further out from said flange portion than said first portion extends, said threaded shaft portion capable of rotation relative to said head portion by the rotation of said key, the threaded first portion of the head portion of the lock bolt being extended through said aperture in said retainer cap member and engaging a lock nut means and a washer means, said lock nut means affixing said washer means to said first portion of said lock bolt, said washer means having an inner flattened portion corresponding with the flattened portion of said threaded first portion of said lock bolt, and a pin means affixed to said washer means, said pin means fitting into a hole in said wheel cover, the hole being located a distance from the aperture in said wheel cover as to be overlaid by said cap member, said pin means and washer means thereby preventing the rotation of said wheel cover independent of said head portion of said lock bolt, the threaded shaft portion of said lock bolt extending through the aperture in said wheel cover to engage said second threaded opening of said spacer lug, said threaded shank portion being rotatable by said key to tighten the flange portion of said lock bolt against said retainer cap means and, upon the removal of said key, to lock said wheel cover to said bracket by the locked non-rotatability of said lock bolt shaft portion within said lock bolt head portion.

2. A locking device as defined in claim 1, wherein said C-shaped bracket includes a planar mid-portion integral with two angularly extending end portions, said attachment means comprising an extension flange portion integral with one of said bracket end portions and being substantially parallel to said bracket mid-portion, and said flange portion having a lug receiving aperture therein.

3. A locking device as defined in claim 2, wherein the aperture in said bracket permits adjustable positioning of said spacer lug and associated fastener means in assembled relation with said bracket, whereby the distance between the one end of said lug receiving aperture in said bracket flange can be adjusted in accordance with variations in the dimensions between the center and a selected wheel lug of an associated vehicle wheel to which the assembly is mounted.

* * * * *